H. B. BISHOP.
MANUFACTURE OF HYDROFLUORIC ACID.
APPLICATION FILED AUG. 8, 1911.
1,150,415.
Patented Aug. 17, 1915.
2 SHEETS—SHEET 2.
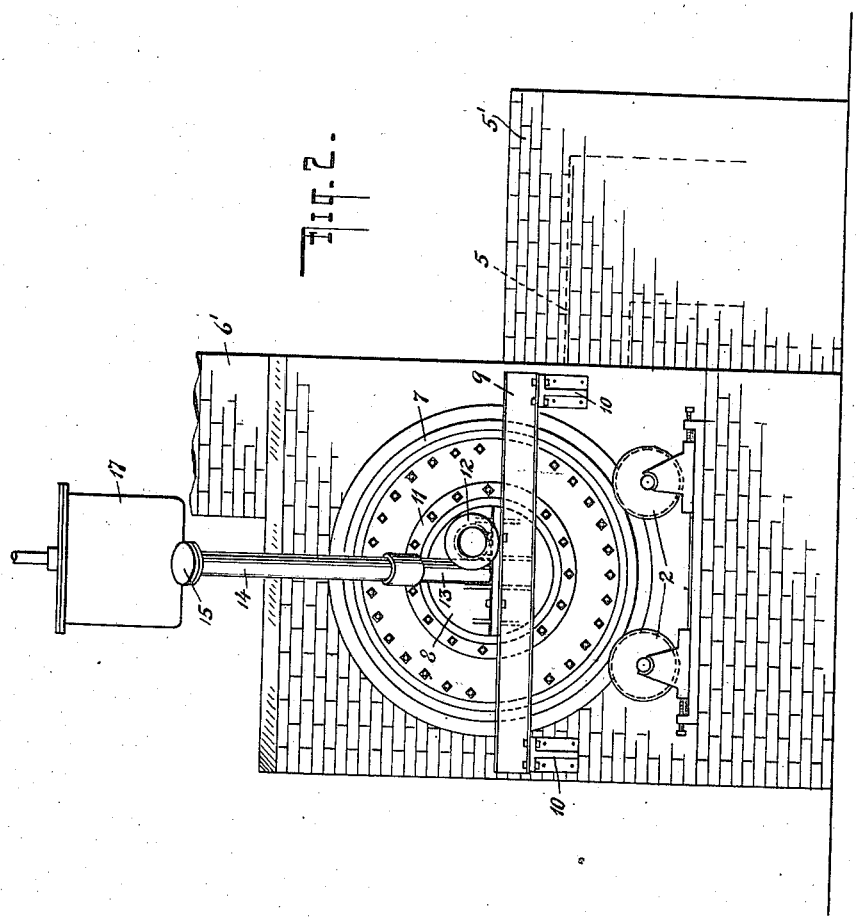
WITNESSES
G. V. Rasmussen
John A. Ferguson
INVENTOR
HOWARD B. BISHOP
BY
ATTORNEYS

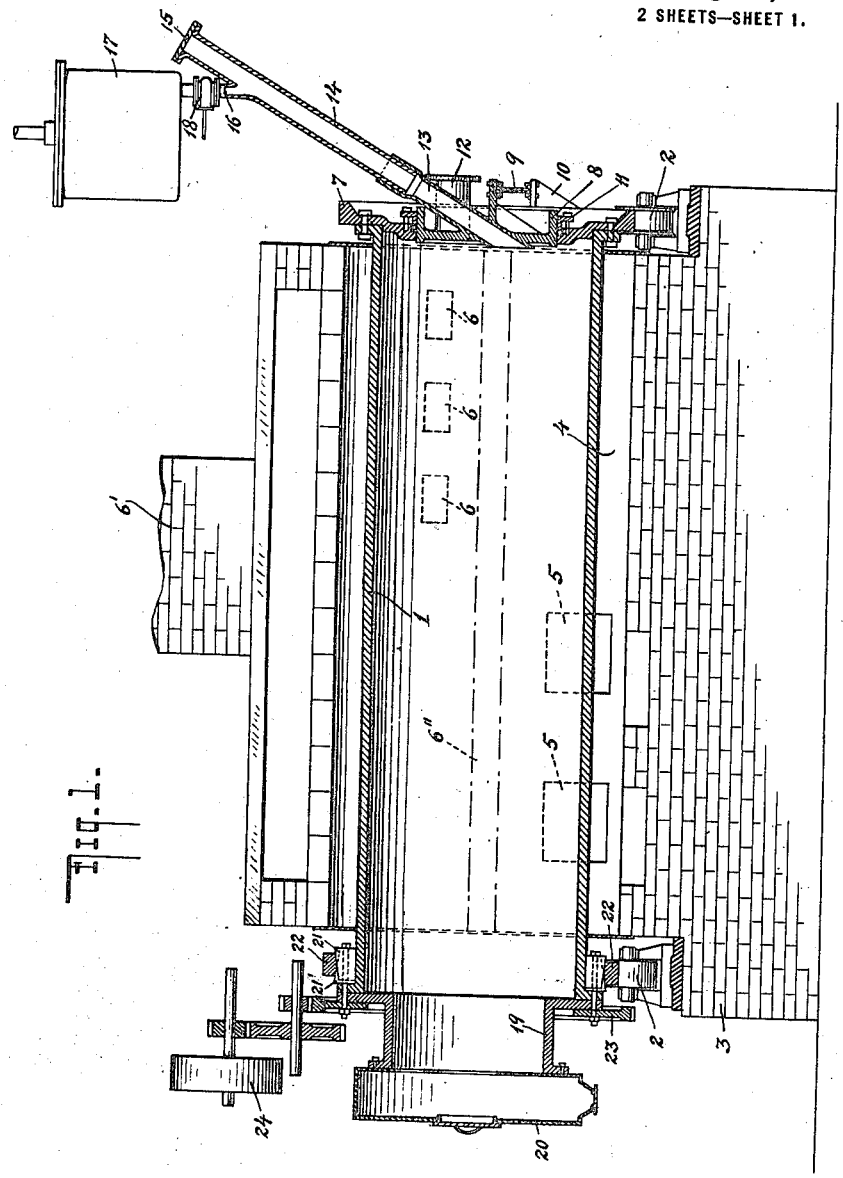

UNITED STATES PATENT OFFICE.

HOWARD BERKEY BISHOP, OF NEW YORK, N. Y., ASSIGNOR TO GENERAL CHEMICAL COMPANY, OF NEW YORK, N. Y., A CORPORATION OF NEW YORK.

MANUFACTURE OF HYDROFLUORIC ACID.

1,150,415. Specification of Letters Patent. Patented Aug. 17, 1915.

Application filed August 8, 1911. Serial No. 643,034.

*To all whom it may concern:*

Be it known that I, HOWARD BERKEY BISHOP, a citizen of the United States, and a resident of the borough of Brooklyn, county of Kings, city and State of New York, have invented certain new and useful Improvements in the Manufacture of Hydrofluoric Acid, of which the following is a specification.

My invention relates to the art of manufacturing hydrofluoric acid from a fluorid, as, for example, calcium fluorid, commonly called fluorspar, and an acid, as, for example, sulfuric acid, and an object thereof is to produce a substantially pure hydrofluoric acid in a practically continuous manner, while at the same time producing a granular and easily handled residue which chemically consists mainly of a salt of the acid employed which is, when sulfuric acid has been employed, a sulfate.

Another object is the production of a process by which the evolution of hydrofluoric acid, in the form of a gas, is substantially constant in volume.

Other objects of my invention will appear in the following description of my process and the preferred embodiment of an apparatus for the accomplishment thereof.

Heretofore hydrofluoric acid was made by intermittent processes which comprised, in general, heating charges of sulfuric acid and fluor spar in vessels preferably of iron or lead, provided with removable hoods or heads through which the evolved gas was conducted to suitable condensing devices. The materials were mixed together in the vessel and then heated to a suitable temperature for causing chemical reaction and consequent gas evolution, this temperature being maintained until the reaction ceased. After each charge had been heated the head was removed and the hard solidified and tenacious cake of calcium sulfate, forming a lining on the bottom of the vessel, was broken up and removed from the vessel. A new charge of fluorid and sulfuric acid might then be introduced. The mixing of the charge was accomplished by hand before the application of heat and on account of the properties of the materials used it was difficult if not impossible to obtain a homogeneous mixture thereof before the incipiency of the reaction. Furthermore, the gas evolved was irregular in flow,—at times being given off in gusts and thus putting a heavy duty upon the condensing device while during a great proportion of the time of evolution, the gas flow was so small as to utilize but a small fraction of the capacity of the condensing apparatus.

My invention comprises a process of manufacturing hydrofluoric acid by which the disadvantages of former processes and apparatus are avoided. One form of apparatus which I may employ for carrying out my process is illustrated by the accompanying drawing in which:

Figure 1 shows said apparatus in longitudinal, vertical section and Fig. 2 shows the same in front elevation.

The decomposition vessel comprises a cylinder 1 which may consist of a flanged, cast iron water pipe of about twelve feet in length and forty inches in diameter, said cylinder being rotatably mounted on rollers 2 adjustably mounted on a brick-work foundation 3. The brick-work is extended around the cylinder being separated therefrom by the annular space 4. This space is connected by flues 5 near the discharge end of the cylinder with a Dutch oven 5' the rear end of which is shown in Fig. 2. Flame and combustion gases are thus conducted from the furnace 5' through the flues 5 to the space 4 for the purpose of heating the cylinder 1, the products of combustion passing around said cylinder and through the outlet flues 6 near the forward end of the cylinder and escaping through the chimney 6'. A baffle 6'' of brick-work extends longitudinally of the cylinder between the inlet flues 5 and the outlet flues 6 and projects across space 4, into close proximity to the cylinder so as to cause the gases entering the flues 5 to pass around the cylinder before entering the outlet flues 6. Since the heat from the furnace is first brought into contact with the cylinder near the discharge end thereof, that end is maintained at a higher degree of temperature than the feed end of the cylinder. To the feed end of the cylinder is bolted an annular ring 7, the periphery of which forms a track for coöperation with the rollers 2 at the forward or feed end of the cylinder, and the central aperture of which is closed by a plate 8. This plate is secured to the I-beam 9 extending transversely across the front of the apparatus and secured to the brick-work thereof by suitable brackets 10. The plate 8 is thus held rigidly and non-rotatably in position to close the opening in the annular ring 7. A packing ring 11 is secured to the ring 7 and said packing ring and its associated packing serves to maintain a gas tight connection between the rotatable and non-rotatable parts. The plate 8 is formed with a gas outlet conduit 12 and with a feed conduit 13, the conduits preferably being cast integrally with the plate and the feed conduit extending angularly upward externally of the cylinder. The upper end of the feed conduit is preferably formed by a pipe 14 suitably joined to the portion 13 of said conduit. The upper end of the pipe 14 is closed by a plate 15, upon the removal of which the conduit, as will be apparent, may easily be cleaned, and near said upper end the pipe 14 is provided with a vertical branch 16, the upper end of which leads to the agitating or mixing device 17 the latter being of any suitable construction. A valve 18 is provided in said branch pipe to control the feed of materials from the mixing device to the feed conduit.

To the rear end of the cylinder 1 is bolted an extension 19, to the end of which is secured a discharge device 20. Surrounding the cylinder and abutting the flange thereof is a circumferentially arranged series of wedges 21' having beveled outer surfaces. There may be any desired number of said wedges and they may be spaced at suitable distances from each other. Coacting with each wedge 21' is a complementary, oppositely disposed wedge 21. The beveled surfaces of said wedges 21 and 21' engage with a ring 22, the outer circumference of which forms a track for coöperation with the rollers 2 at the discharge end of the cylinder and the inner surface of which is doubly beveled to coöperate with the beveled surfaces of the wedges 21 and 21'. The bolts for securing the extension 19 to the cylinder 1, pass through the wedges 21 and 21', and also through the peripherally toothed gear wheel 23. As will be clearly understood, the tightening of the nuts on the ends of these bolts will not only secure the parts referred to rigidly together but will draw the wedges 21 and 21' axially toward each other and thus at all times firmly fasten the track ring 22 in proper position. The gear 23 is actuated in any suitable way as for instance by a train of gears operated by a power pulley 24.

In the operation of my device, a charge of fluorid and acid, as, for example, fluorspar and sulfuric acid is introduced in proper proportions into the agitating apparatus 17 in which these materials are thoroughly agitated and mixed and from which, by the operation of the valve 18, the more or less liquid mixture is introduced into the feed conduit and by this means into the decomposing cylinder 1, which has been previously set in motion by the rotation of the power pulley 24 and heated from the furnace 5'. The reaction between the fluorid and the sulfuric acid to form hydrofluoric acid does not take place in the mixer 17 to any great extent on account of the relatively low temperature thereof. Upon reaching the interior of the cylinder, however, hydrofluoric acid gas is immediately evolved. The drum continuously presents new, heated surfaces to the charge because of its rotation, and the charge itself is continuously turned over and thoroughly agitated. The charge, either because of the introduction of subsequent charges or because of a slight inclination of the drum, gradually makes its way toward the discharge end thereof, being agitated all the time. Moreover, as the charge moves toward the rear end of the cylinder it gradually comes into contact with hotter portions of the drum, resulting in carrying on the gas evolving reaction to a degree beyond that which would take place at lower temperatures. Each new charge when introduced into the decomposing cylinder, falls directly upon the materials therein and is not subjected immediately, therefore, to the temperature of the walls of the cylinder and the evolution of gas is not so sudden and abundant as would otherwise be the case. When the charge reaches the discharge hopper 20 the reaction is complete and the calcium sulfate product may be removed. The removal of the sulfate may take place at suitable intervals and in regulatable amounts and has no material effect on the gas flow. The gas evolved, as will be readily understood, escapes through the outlet 12 and is then conducted to suitable condensing apparatus. It will be seen that by setting the valve 18 in partially open position, and introducing the fluorid and sulfuric acid continuously, a wholly continuous process is provided. Because the reaction takes place at gradually increasing temperatures, the gas evolution is substantially constant as compared with that in the processes heretofore used; a continuous flow, therefore, passes through the outlet passage. It is to be noted that even if the mixing is done intermittently in the mixing device 17 and after each mixing process the mixture formed is run into the decomposing device 1, the flow of gas at the outlet pipe 12 is nevertheless continuous and substantially constant in volume. Because the charges are constantly and thoroughly agitated, the sulfate collected from the discharge end of the device consists of small, loose, granular particles and consequently is easily handled.

Many advantages due to the use of my device will be apparent from a mere comparison between it and former devices for the same purpose, but some of the special advantages may be briefly mentioned. 1. The gas flow is substantially uniform and constant and the gas condensing apparatus is in effective operation substantially all of the time, which is not the case in the old processes. 2. The calcium sulfate is removed in about the proportion and rate at which it is formed, and in a loose, granular and easily handled form, and it does not have to be broken out from the apparatus by crow bars or the like as is the case in the old processes. 3. The apparatus is substantially gas tight; there are few if any leaks and the health and comfort of the attending laborers is very little disturbed, as against the considerable disturbances in these directions occasioned by the old processes. 4. One gas condensing system can be made to take care of the product of more than four times the quantity of fluorspar decomposed in apparatus of the old type, and the four gas condensing systems therein usually employed. 5. The fuel consumption is reduced by about one-half of the fuel consumed in the old processes for the same quantity of fluorspar. 6. The repairs are less than one-fourth the repairs in the old apparatus for the same weight of fluorspar worked up. 7. The space required is less than one-fourth of that which would be required under the old processes for the same weight of fluorspar worked up. 8. The yield of final product is about one-eighth better than by the old processes. 9. Less of the silica which is usually contained in fluorspar is carried over into the finished product in my process than in the old processes. 10. The time required for commercially complete decomposition of charges of the same size is much shorter by my new process than by the old processes.

The proportions of fluorspar and sulfuric acid and the temperature of operation may be widely varied but in practice I prefer to use 200 pounds of 99% sulfuric acid at a temperature of about 80° F. or less, to which I add, stirring the while, 150 pounds of finely ground fluorspar. The temperature within the cylinder near the discharge end thereof is preferably maintained at about 600° F. and near the charging or feed end at about 240° to 260° F. After having mixed the charge in the device 17 for a minute or two and before any appreciable reaction has taken place, it is run into the decomposition cylinder. Successive charges are added in the same way and the corresponding amounts of calcium sulfate are withdrawn from the device 20. Three or four hours are required for a charge such as has been described to pass through my preferred form of apparatus. I find it desirable and suitable to introduce such charges and remove the corresponding amounts of sulfate under these conditions of apparatus and temperatures about every forty minutes although, of course, I may also charge the mixture of fluorspar and acid continuously into the decomposing device since it is so constructed that the revolving of the cylinder need not be interrupted during such charging.

I claim:

1. The process of making hydrofluoric acid, which comprises heating a fluorid and an acid, capable of reacting to produce a solid in the form of a hard cake, and continuously breaking up the entire mass of the reacting materials during the reaction thereof, whereby the formation of said hard cake is prevented.

2. The process of making hydrofluoric acid, which comprises applying heat to a fluorid and an acid, capable of reacting to produce a solid in the form of a hard cake, and continuously breaking up the entire mass of the reacting materials and maintaining the application of heat thereto during the reaction thereof, whereby the formation of said hard cake is prevented.

3. The process of making hydrofluoric acid, which comprises simultaneously heating to gradually increasing temperatures a fluorid and an acid, capable of reacting to produce a solid in the form of a hard cake, and continuously breaking up the entire mass of the reacting materials during the reaction thereof, whereby the formation of said hard cake is prevented.

4. The process of making hydrofluoric acid, which comprises heating calcium fluorid and an acid, capable of reacting to produce a solid in the form of a hard cake, and continuously breaking up the entire mass of reacting materials during the reaction thereof, whereby the formation of said hard cake is prevented.

5. The process of making hydrofluoric acid, which comprises heating calcium fluorid and sulfuric acid and continuously breaking up the entire mass of reacting materials during the reaction thereof, whereby the formation of a hard cake of calcium sulfate is prevented.

6. The process of making hydrofluoric acid, which comprises mixing calcium fluorid and sulfuric acid and subsequently simultaneously heating and continuously breaking up the entire mass of reacting materials during the reaction thereof, whereby the formation of a hard cake of calcium sulfate is prevented.

7. The process of making hydrofluoric acid, which comprises mixing calcium fluorid and sulfuric acid and subsequently simultaneously heating to gradually increasing temperatures and continuously breaking up the entire mass of reacting materials during the reaction thereof, whereby the formation of a hard cake of calcium sulfate is prevented.

8. The process of making hydrofluoric acid which consists in mixing charges of calcium fluorid and sulfuric acid and continuously, simultaneously agitating and heating to gradually increasing temperatures previously mixed charges.

9. The process of making hydrofluoric acid which consists in continuously agitating calcium fluorid and sulfuric acid and continuously, simultaneously agitating and heating to gradually increasing temperatures the previously agitated substances.

10. The process of making hydrofluoric acid which consists in agitating calcium fluorid and sulfuric acid, continuously, simultaneously agitating said materials and heating them to gradually increasing temperatures, continuously condensing the evolved hydrofluoric acid and removing the loose, granular calcium sulfate.

In testimony whereof, I have hereunto set my hand in the presence of two subscribing witnesses.

HOWARD BERKEY BISHOP.

Witnesses:
JOHN A. FERGUSON,
JOHN A. KEHLENBECK.